United States Patent
Wilson et al.

(10) Patent No.: US 10,242,351 B1
(45) Date of Patent: Mar. 26, 2019

(54) DIGITAL WALLET FOR GROUPS

(71) Applicant: Square, Inc., San Francisco, CA (US)

(72) Inventors: Mathew Wilson, San Francisco, CA (US); Nicholas Dower, San Francisco, CA (US); Shawn Morel, San Francisco, CA (US)

(73) Assignee: SQUARE, INC., San Francisco, CA (US)

( * ) Notice: Subject to any disclaimer, the term of this patent is extended or adjusted under 35 U.S.C. 154(b) by 0 days.

(21) Appl. No.: 15/800,910

(22) Filed: Nov. 1, 2017

Related U.S. Application Data

(63) Continuation of application No. 14/272,298, filed on May 7, 2014, now abandoned.

(51) Int. Cl.
    *G06Q 20/10*  (2012.01)
    *G06Q 40/02*  (2012.01)

(52) U.S. Cl.
    CPC .......... *G06Q 20/102* (2013.01); *G06Q 40/02* (2013.01)

(58) Field of Classification Search
    USPC .......................................................... 705/44
    See application file for complete search history.

(56) References Cited

U.S. PATENT DOCUMENTS

| | | | |
|---|---|---|---|
| 4,609,957 A | 9/1986 | Gentet et al. | |
| 5,497,368 A | 3/1996 | Reijnierse et al. | |
| 5,729,591 A | 3/1998 | Bailey | |
| 6,173,272 B1 * | 1/2001 | Thomas | G06Q 20/00 705/42 |
| 6,308,227 B1 | 10/2001 | Kumar et al. | |
| 6,513,018 B1 * | 1/2003 | Culhane | G06Q 40/00 705/35 |

(Continued)

FOREIGN PATENT DOCUMENTS

| | | |
|---|---|---|
| CA | 2 722 951 A1 | 11/2009 |
| EP | 2 184 722 A1 | 5/2010 |
| WO | 2013/116806 A1 | 8/2013 |

OTHER PUBLICATIONS

R Nagasubramanian, Online Payment—Innovation in Split Tender Payment, International Journal of Computer Applications, Oct. 2012 (0975-8887) vol. 55-No. 10, (Online Payment).*

(Continued)

*Primary Examiner* — Chikaodinaka Ojiaku
(74) *Attorney, Agent, or Firm* — Polsinelli PC-Square

(57) ABSTRACT

Methods, systems, and computer program products for a digital wallet for a group of people. A group of customers may gather for an event, e.g., a party, in which each person in the group may purchase goods or services on behalf of the group from a merchant. A customer device executing a digital wallet application program acts like a wallet for the entire group. The customer device creates group tab. The customer device associates images of each person in the group to the group tab, and submits information on the group, including the images, to a merchant device operated by the merchant. The merchant device opens the group tab for managing purchases related to the group. At the end of the event, upon receiving an input to close the tab, the customer device can receive a single bill including a total amount, and divide the total amount among people in the group.

22 Claims, 11 Drawing Sheets

(56) References Cited

U.S. PATENT DOCUMENTS

| | | | |
|---|---|---|---|
| 6,847,942 B1* | 1/2005 | Land | G06Q 30/04 705/30 |
| 7,163,148 B2 | 1/2007 | Durbin et al. | |
| 7,343,317 B2 | 3/2008 | Jokinen et al. | |
| 7,343,335 B1 | 3/2008 | Olliphant | |
| 7,383,226 B2* | 6/2008 | Kight | G06Q 20/04 705/40 |
| 8,055,564 B2* | 11/2011 | Wehunt | G06Q 10/00 705/35 |
| 8,065,190 B2* | 11/2011 | Collas | G06Q 20/12 705/26.1 |
| 8,090,656 B2* | 1/2012 | Solomon | G06Q 20/108 705/35 |
| 8,281,998 B2 | 10/2012 | Tang et al. | |
| 8,341,074 B1* | 12/2012 | Reid | G06Q 40/02 705/30 |
| 8,401,968 B1 | 3/2013 | Schattauer et al. | |
| 8,500,010 B1* | 8/2013 | Marcus | G06K 7/089 235/380 |
| 8,509,734 B1 | 8/2013 | Gupta et al. | |
| 8,635,158 B1 | 1/2014 | Ledder et al. | |
| 8,645,222 B1 | 2/2014 | Tamassia et al. | |
| 8,654,222 B2 | 2/2014 | Kuwazoe | |
| 8,660,965 B1 | 2/2014 | Bickerstaff | |
| 8,662,389 B2 | 3/2014 | Dorsey et al. | |
| 8,695,877 B2 | 4/2014 | Mesaros | |
| 9,058,604 B2 | 6/2015 | Carr et al. | |
| 9,107,064 B1 | 8/2015 | Ramalingam et al. | |
| 9,619,797 B2 | 4/2017 | Dorsey et al. | |
| 2002/0077974 A1 | 6/2002 | Ortiz | |
| 2002/0116331 A1* | 8/2002 | Cataline | G06Q 20/00 705/39 |
| 2002/0161630 A1* | 10/2002 | Kern | G06Q 30/02 705/14.32 |
| 2002/0179704 A1 | 12/2002 | Deaton | |
| 2003/0028483 A1* | 2/2003 | Sanders | G06Q 20/10 705/40 |
| 2004/0012875 A1 | 1/2004 | Wood | |
| 2004/0041911 A1 | 3/2004 | Odagiri et al. | |
| 2004/0044616 A1* | 3/2004 | Salter | G06Q 40/02 705/38 |
| 2004/0058705 A1 | 3/2004 | Morgan et al. | |
| 2005/0165684 A1* | 7/2005 | Jensen | G06Q 20/00 705/44 |
| 2005/0236480 A1 | 10/2005 | Vrotsos et al. | |
| 2005/0247787 A1 | 11/2005 | Von Mueller et al. | |
| 2006/0064380 A1* | 3/2006 | Zukerman | G06Q 20/10 705/44 |
| 2006/0106716 A1* | 5/2006 | Hurwitz | G06Q 20/102 705/40 |
| 2006/0112006 A1* | 5/2006 | Hurwitz | G06Q 20/102 705/40 |
| 2006/0112007 A1* | 5/2006 | Hurwitz | G06Q 20/102 705/40 |
| 2006/0129484 A1* | 6/2006 | Hurwitz | G06Q 20/102 705/40 |
| 2006/0146839 A1* | 7/2006 | Hurwitz | G06Q 20/06 370/401 |
| 2006/0259358 A1* | 11/2006 | Robinson | G06Q 30/02 705/14.41 |
| 2006/0273158 A1 | 12/2006 | Suzuki | |
| 2006/0288367 A1* | 12/2006 | Swix | H04N 7/17318 725/46 |
| 2007/0078760 A1 | 4/2007 | Conaty et al. | |
| 2007/0078771 A1* | 4/2007 | Allin | G06Q 10/06 705/52 |
| 2007/0106558 A1* | 5/2007 | Mitchell | G06Q 20/0453 705/16 |
| 2007/0136162 A1 | 6/2007 | Thibodeau et al. | |
| 2007/0198382 A1* | 8/2007 | Ferrari | G06Q 40/00 705/35 |
| 2007/0233615 A1* | 10/2007 | Tumminaro | G06Q 20/12 705/75 |
| 2007/0255620 A1 | 11/2007 | Tumminaro et al. | |
| 2007/0255653 A1* | 11/2007 | Tumminaro | G06Q 20/10 705/39 |
| 2008/0004989 A1* | 1/2008 | Yi | G06Q 30/02 705/26.1 |
| 2008/0103972 A1 | 5/2008 | Lane | |
| 2008/0167980 A1* | 7/2008 | Aaron | G06Q 20/14 705/35 |
| 2008/0183619 A1* | 7/2008 | Gould | G06Q 20/102 705/40 |
| 2008/0195510 A1 | 8/2008 | Olliphant | |
| 2008/0201769 A1* | 8/2008 | Finn | G06Q 20/04 726/7 |
| 2008/0208762 A1 | 8/2008 | Arthur et al. | |
| 2008/0275779 A1* | 11/2008 | Lakshminarayanan | G06Q 20/02 705/39 |
| 2008/0320036 A1* | 12/2008 | Winter | G06F 17/30265 |
| 2009/0006151 A1* | 1/2009 | Zarghami | G06Q 10/06375 705/7.31 |
| 2009/0006398 A1* | 1/2009 | Lam | G06Q 30/02 |
| 2009/0024533 A1* | 1/2009 | Fernandes | G06Q 20/10 705/75 |
| 2009/0076925 A1 | 3/2009 | DeWitt et al. | |
| 2009/0144161 A1 | 6/2009 | Fisher | |
| 2009/0187492 A1 | 7/2009 | Hammad et al. | |
| 2009/0194584 A1* | 8/2009 | Alexander | G06Q 40/02 235/379 |
| 2010/0030578 A1 | 2/2010 | Siddique et al. | |
| 2010/0063893 A1* | 3/2010 | Townsend | G06Q 20/12 705/26.1 |
| 2010/0108762 A1 | 5/2010 | Morley, Jr. | |
| 2010/0138341 A1 | 6/2010 | Solomon et al. | |
| 2010/0191629 A1 | 7/2010 | Olliphant | |
| 2010/0222000 A1 | 9/2010 | Sauer et al. | |
| 2010/0312636 A1* | 12/2010 | Coulter | G06Q 20/10 705/14.38 |
| 2010/0332339 A1 | 12/2010 | Patel et al. | |
| 2011/0040624 A1 | 2/2011 | Jhanji | |
| 2011/0078073 A1* | 3/2011 | Annappindi | G06Q 40/02 705/38 |
| 2011/0106698 A1* | 5/2011 | Isaacson | G06Q 20/105 705/41 |
| 2011/0137804 A1 | 6/2011 | Peterson | |
| 2011/0174879 A1 | 7/2011 | Morley | |
| 2011/0178883 A1 | 7/2011 | Granbery et al. | |
| 2011/0191196 A1 | 8/2011 | Orr et al. | |
| 2011/0202463 A1 | 8/2011 | Powell | |
| 2011/0259957 A1 | 10/2011 | Tsai | |
| 2011/0276419 A1 | 11/2011 | Johnson et al. | |
| 2012/0016794 A1 | 1/2012 | Orr et al. | |
| 2012/0030091 A1* | 2/2012 | Hu | G06Q 40/02 705/38 |
| 2012/0054100 A1* | 3/2012 | Pfohl | G06Q 30/0279 705/44 |
| 2012/0084177 A1* | 4/2012 | Tanaka | G06Q 30/0613 705/26.41 |
| 2012/0095871 A1 | 4/2012 | Dorsey et al. | |
| 2012/0095907 A1 | 4/2012 | Dorsey et al. | |
| 2012/0143753 A1* | 6/2012 | Gonzalez | G06Q 20/12 705/41 |
| 2012/0143761 A1* | 6/2012 | Doran | G06Q 20/08 705/44 |
| 2012/0166298 A1 | 6/2012 | Smith et al. | |
| 2012/0173349 A1* | 7/2012 | Buckley | G06Q 20/10 705/16 |
| 2012/0173396 A1 | 7/2012 | Melby et al. | |
| 2012/0239417 A1* | 9/2012 | Pourfallah | G06Q 50/22 705/2 |
| 2012/0246074 A1* | 9/2012 | Annamalai | G01S 1/68 705/44 |
| 2012/0303425 A1* | 11/2012 | Katzin | G06Q 20/027 705/14.4 |
| 2013/0006782 A1 | 1/2013 | Schwarzkopf et al. | |
| 2013/0006853 A1* | 1/2013 | Amundsen | G06Q 40/00 705/40 |

(56) References Cited

U.S. PATENT DOCUMENTS

| | | | |
|---|---|---|---|
| 2013/0030890 A1* | 1/2013 | Richardson | G06Q 30/00 705/14.14 |
| 2013/0031004 A1 | 1/2013 | Dorsey et al. | |
| 2013/0041824 A1 | 2/2013 | Gupta | |
| 2013/0054330 A1* | 2/2013 | O'Donnell | G06Q 30/06 705/14.23 |
| 2013/0060623 A1* | 3/2013 | Walker | G06Q 30/0259 705/14.27 |
| 2013/0085931 A1* | 4/2013 | Runyan | G06Q 20/322 705/40 |
| 2013/0173464 A1* | 7/2013 | Quillian | G06Q 30/06 705/40 |
| 2013/0173467 A1 | 7/2013 | Nuzzi et al. | |
| 2013/0173470 A1 | 7/2013 | Nuzzi et al. | |
| 2013/0179330 A1* | 7/2013 | Quillian | G06Q 40/025 705/38 |
| 2013/0204886 A1 | 8/2013 | Faith et al. | |
| 2014/0006184 A1 | 1/2014 | Godsey | |
| 2014/0006205 A1 | 1/2014 | Berry et al. | |
| 2014/0047045 A1 | 2/2014 | Baldwin et al. | |
| 2014/0156508 A1 | 6/2014 | Argue et al. | |
| 2014/0164221 A1 | 6/2014 | Sinton et al. | |
| 2014/0172704 A1* | 6/2014 | Atagun | G06Q 40/02 705/44 |
| 2014/0222663 A1* | 8/2014 | Park | G06Q 20/29 705/39 |
| 2014/0279098 A1 | 9/2014 | Ham | |
| 2015/0031393 A1 | 1/2015 | Post et al. | |
| 2015/0149350 A1* | 5/2015 | Ananda Kumar | G06Q 20/14 705/40 |
| 2015/0178835 A1* | 6/2015 | Quillian | G06Q 40/04 705/37 |
| 2015/0254648 A1 | 9/2015 | Clements et al. | |

OTHER PUBLICATIONS

Non-Final Office Action dated Jan. 21, 2016, for U.S. Appl. No. 14/272,298, of Wilson, M., et al., filed May 7, 2014.
Final Office Action dated Jun. 27, 2016, for U.S. Appl. No. 14/272,298, of Wilson, M., et al., filed May 7, 2014.
Non-Final Office Action dated Sep. 22, 2016, for U.S. Appl. No. 14/272,298, of Wilson, M. et al., filed May 7, 2014.
Final Office Action dated Jun. 1, 2017, for U.S. Appl. No. 14/272,298, of Wilson, M., et al., filed May 7, 2014.
Advisory Action dated Sep. 20, 2017, for U.S. Appl. No. 14/272,298, of Wilson, M., et al., filed May 7, 2014.
Non-Final Office Action dated Jun. 22, 2012, for U.S. Appl. No. 13/088,053, of Dorsey J., filed Apr. 15, 2011.
Non-Final Office Action dated Jun. 22, 2012, for U.S. Appl. No. 13/088,048, of Dorsey, J., et al., filed Apr. 15, 2011.
Non-Final Office dated Oct. 5, 2012, for U.S. Appl. No. 13/088,038, of Dorsey, J., et al., filed Apr. 15, 2011.
Final Office Action dated Nov. 23, 2012, for U.S. Appl. No. 13/088,053, of Dorsey J., filed Apr. 15, 2011.
Final Office Action dated Nov. 26, 2012, for U.S. Appl. No. 13/088,048, of Dorsey, J., et al., filed Apr. 15, 2011.
Non-Final Office Action dated Dec. 21, 2012, for U.S. Appl. No. 13/605,073, of Dorsey, J., et al., filed Sep. 6, 2012.
Non-Final Office Action dated Jan. 18, 2013, for U.S. Appl. No. 13/605,489, of Dorsey, J., et al., filed Sep. 6, 2012.
Non-Final Office Action dated Apr. 9, 2013, for U.S. Appl. No. 13/605,073, of Dorsey, J., et al., filed Sep. 6, 2012.
Final Office Action dated Sep. 6, 2013, for U.S. Appl. No. 13/088,038, of Dorsey, J., et al., filed Apr. 15, 2011.
Notice of Allowance dated Oct. 9, 2013, for U.S. Appl. No. 13/605,073, of Dorsey, J., et al., filed Sep. 6, 2012.
Final Office Action dated Oct. 10, 2013, for U.S. Appl. No. 13/605,489, of Dorsey, J., et al., filed Sep. 6, 2012.
Advisory Action dated Oct. 24, 2013, for U.S. Appl. No. 13/088,038, of Dorsey, J., et al., filed Apr. 15, 2011.
Non-Final Office Action dated Oct. 25, 2013, for U.S. Appl. No. 13/088,048, of Dorsey, J., et al., filed Apr. 15, 2011.
Non-Final Office Action dated Oct. 29, 2013, for U.S. Appl. No. 13/088,053, of Dorsey J., filed Apr. 15, 2011.
Non-Final Office Action dated Jun. 24, 2014, for U.S. Appl. No. 13/088,038, of Dorsey, J., et al., filed Apr. 15, 2011.
Final Office Action dated Jul. 18, 2014, for U.S. Appl. No. 13/088,048, of Dorsey, J., et al., filed Apr. 15, 2011.
Non-Final Office Action dated Oct. 15, 2014, for U.S. Appl. No. 13/605,489, of Dorsey, J., et al., filed Sep. 6, 2012.
Non-Final Office Action dated Nov. 12, 2014, for U.S. Appl. No. 13/088,048, of Dorsey, J., et al., filed Apr. 15, 2011.
Non-Final Office Action daed Mar. 3, 2015, for U.S. Appl. No. 13/088,038, of Dorsey, J., et al., filed Apr. 15, 2011.
Non-Final Office Action dated Mar. 27, 2015, for U.S. Appl. No. 13/605,489, of Dorsey, J., et al., filed Sep. 6, 2012.
Ex-parte Quayle dated Aug. 17, 2015, for U.S. Appl. No. 13/088,048, of Dorsey, J., et al., filed Apr. 15, 2011.
Final Office Action dated Nov. 6, 2015, for U.S. Appl. No. 13/088,038, of Dorsey, J., et al., filed Apr. 15, 2011.
Final Office Action dated Dec. 3, 2015, for U.S. Appl. No. 13/605,489, of Dorsey, J., et al., filed Sep. 6, 2012.
Non-Final Office Action dated Jan. 21, 2016, for U.S. Appl. No. 13/088,048, of Dorsey, J., et al., filed Apr. 15, 2011.
Advisory Action dated Feb. 24, 2016, for U.S. Appl. No. 13/088,038, of Dorsey, J., et al., filed Apr. 15, 2011.
Non-Final Office Action dated Apr. 7, 2016, for U.S. Appl. No. 13/088,038, of Dorsey, J., et al., filed Apr. 15, 2011.
Notice of Allowance dated Jun. 21, 2016, for U.S. Appl. No. 13/088,048, of Dorsey, J., et al., filed Apr. 15, 2011.
Notice of Allowance dated Nov. 17, 2016, for U.S. Appl. No. 13/088,038, of Dorsey, J., et al., filed Apr. 15, 2011.
Non-Final Office dated Sep. 25, 2017, for U.S. Appl. No. 14/612,065, of Wagner, D.R., et al., filed Feb. 2, 2015.

* cited by examiner

US 10,242,351 B1

DIGITAL WALLET FOR GROUPS

CROSS-REFERENCE TO RELATED APPLICATIONS

This application is a continuation of U.S. patent application Ser. No. 14/272,298, entitled "DIGITAL WALLET FOR GROUPS", filed on May 7, 2014; which is hereby expressly incorporated herein by reference in its entirety.

BACKGROUND

This disclosure relates to payment processing.

In a sales transaction where goods or services are sold for money, more than one customer may pay the money for the goods and services. For example, when a group of people visit a bar, each person in the group may order the person's own drink and food at a different time. If the people all sit at a table, the merchant may provide one single bill. If the people move around at the bar, it may be difficult to track all purchases and put the purchases in one bill.

BRIEF DESCRIPTION OF THE DRAWINGS

Like reference numbers and designations in the various drawings indicate like elements.

DETAILED DESCRIPTION

Figure 1:
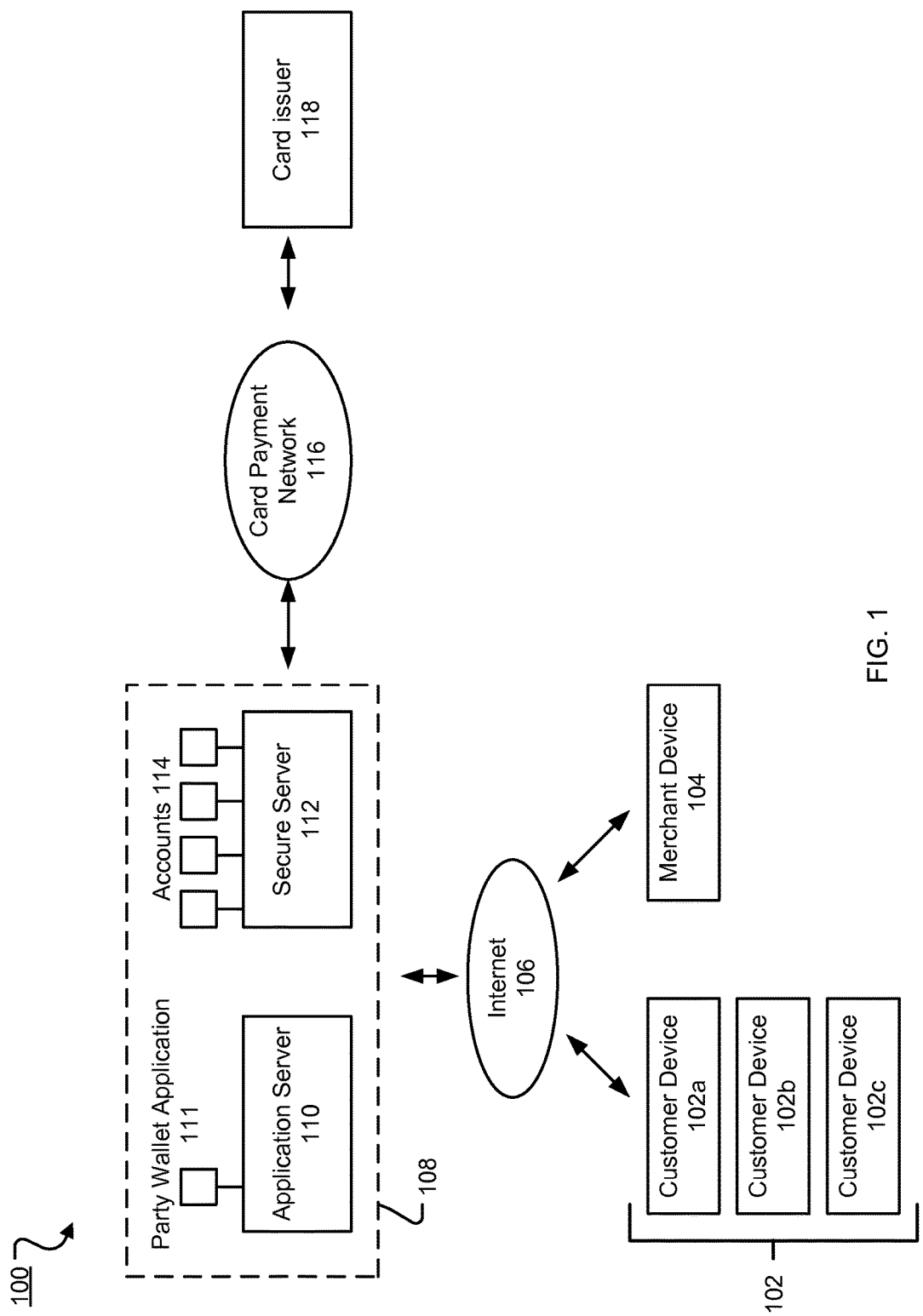
FIG. 1 is a schematic illustration of an example payment system architecture.

A group of customers may gather for an event, e.g., a party, in which each person in the group may purchase goods or services on behalf of the group from a merchant. A customer device executing a digital wallet application program acts like a wallet for the entire group. The customer device creates a group tab. The customer device associates images of each person in the group to the group tab, and submits information on the group, including the images, to a merchant device operated by the merchant. The merchant device opens the group tab for managing purchases related to the group. At the end of the event, upon receiving an input to close the tab, the customer device receives a single bill including a total amount, and may further divide the total amount among people in the group. The customer device can make a single total payment on behalf of the group, or can submit portions of a bill of the total payment to customer devices of the people in the group for reimbursement.

The subject matter of this specification includes systems, computer program products stored in a non-transitory storage medium, and methods for perform operations of receiving, at a customer device, a user input requesting to create a group tab for purchasing goods or services from a merchant, the group tab being associated with a social gathering having multiple members and being linked to a financial account, the user input being from a user who is one of the members; adding, by the customer device, a group identifier to the group tab and an image of each of the members of the social gathering to the group tab; transmitting a request, by the customer device and to a merchant device of the merchant through a payment service system, to open the group tab on the merchant device, wherein transmitting the request to open the group tab includes transmitting the group identifier of the group tab and each image added to the group tab to the merchant device; receiving, at the merchant device, a request from the merchant, who operates the merchant device, to open the group tab, the request from the merchant being made in response to a member of the social gathering requesting to purchase goods or services from the merchant for the group by providing the group identifier; in response to receiving the request, displaying, at the merchant device, images of members of the social gathering, the images including an image of the requesting member for authentication by the merchant; receiving, at the merchant device and from the merchant a selection of the image, the selection authenticating the member; adding, by the merchant device, an identifier of the goods or services purchased and a price of the goods or services to the group tab upon successful authentication; and upon receiving a request to close the tab, sending, by the merchant device or the customer device, a payment amount that includes an amount of the goods or services purchased by the member and other members of the social gathering to a financial service for authorization.

In some implementations, the operations can include submitting a respective split bill from the customer device or from a server coupled to the customer device and to a respective customer device of each of the members, each split bill including an amount of all goods or services purchased by the members divided by number of members.

The subject matter of this specification includes systems, computer program products stored in a non-transitory storage medium, and methods for perform operations of receiving, from a customer device, a user input requesting to create a group tab for purchasing goods or services from a merchant, the group tab being associated with a group of people; adding a group identifier to the group tab and an image of each of member of the group to the group tab; transmitting the group tab to a merchant device of the merchant, including indicating to the merchant device that each member of the user group, upon authentication using the group identifier and the images, is authorized to purchase the goods or services and is authorized to charge the purchased goods or services to the group tab.

In various implementation, adding an image of each member to the group tab can include obtaining a group image that includes an image of each member of the group; and adding the group image to the group tab. Adding an image of each member to the group tab can include obtaining an individual image for each member of the group; and adding each individual image to the group tab.

The operations can include receiving an input indicating that the members of the group are no longer authorized to purchase goods or services for the group; in response, determining, by the customer device and for each member of the group, a share of a total amount charged to the group tab; and submitting, by the customer device, each share to a customer device of a corresponding member. Determining the share for each member can include dividing the total amount equally among the members or designating the shares to the members according to an amount of goods or services purchased by each member. Submitting each share to a customer device of a corresponding member can include composing an electronic message and sending the electronic message to a first customer device of a first member; and requesting, by the customer device, a second customer device of a second member to authorize charging the share to a digital wallet on a second customer device of the second member.

The operations can include receiving, at the merchant device, the group tab; providing, for display at the merchant device, the images of the members of the group; upon receiving an input at the merchant device confirming that an image of a buyer who claims to be a member of the group is among the images, displaying a user interface for entry of the item to be purchased by the buyer; and charging a price of the item to the group tab.

Providing the images for display can include, upon receiving, by the merchant device, an input for processing the group tab, displaying a group image or displaying individual images of each member. The input can include an input to zoom in on the group image. Displaying individual images of each member comprises displaying the individual images simultaneously on a display device, or in sequence on the display device, upon receiving an input to zoom in.

The subject matter of this specification includes systems, computer program products stored in a non-transitory storage medium, and methods for perform operations of receiving a group tab, the group tab including a group identifier and one or more images of members of a group of people each of whom is authorized to purchase goods or services for the group, receiving, at the merchant device, a request to open the group tab; in response to receiving the request, displaying, at the merchant device, the one or more images; receiving, at the merchant device and the merchant a selection of an image from the images, the selection authenticating a member of the group requesting to purchase the goods or services by providing the group identifier; and in response, adding, by the merchant device, a price of the goods or services purchased by the member to the group tab upon successful authentication.

In various implementations, the operations can include, upon receiving a request to close the tab, sending, by the merchant device, a payment amount that includes an amount of the goods or services purchased by the member and other members of the social gathering to a financial service for authorization. The one or more images include a group image of at least two members of the group. Each image can be an individual image for each member of the group. The operations can include receiving an input indicating that the members of the group are no longer authorized to purchase goods or services for the group; in response, determining, for each member of the user group, a share of a total amount charged to the group tab; and submitting each share to a customer device of a corresponding member. Determining the share for each member can include dividing the total amount equally among the members or designating the shares to the members according to an amount of goods or services purchased by each member. Submitting each share to a customer device of a corresponding member can include composing an electronic message, and sending the electronic message to a first customer device of a first member; and requesting a second customer device of a second member to authorize charging the share through a digital wallet of the second member.

The features described in this specification can be implemented to achieve one or more advantages. For example, the features can simplify payment of items when multiple customers purchase the items. One customer can act as an organizer of a social event. Multiple customers can participate in a point-of-sale electronic payment transaction with a merchant without having to calculate each customer's share. In addition, the customers can conduct the transaction without using a credit card. Merchants can be provided with one bill for a payment transaction from a payment service system even if multiple customers pay individually.

The details of one or more implementations of the subject matter described in this specification are set forth in the accompanying drawings and the description below. Other features, aspects, and advantages of the subject matter will become apparent from the description, the drawings, and the claims.

FIG. 1 is a schematic illustration of the architecture of an example payment system 100. The overall system 100 includes multiple customer devices 102 and a merchant device 104. Each customer device 102, as well as the merchant device 104, is connected to a network 106, e.g., the Internet. In general, there is one customer device per customer who will join in a payment transaction. Although FIG. 1 illustrates three customer devices 102a, 102b, 102c, there could be just two customer devices, or four or more customer devices. Each customer device 102 is a mobile computing device, e.g., a smartphone, a tablet computer, or a wearable computing device. Each customer device 102 is configured to execute a customer application, e.g., a digital wallet application program usable by a group of people. The merchant device 104 is a computing device configured to execute a merchant application, e.g., a cashier application program. The merchant device 104 can be a mobile device, a desktop computer, a laptop computer, a cash register, a dedicated point of sale system, or other data processing apparatus.

A payment processor operates a payment service system 108. The customer and merchant devices can communicate with the payment service system 108 using the network 106. The payment service system 108 includes an application server 110 and a secure server 112 to process transactions between each customer device 102 and the merchant device 104. In general, the application server 110 handles non-secure information. For example, the application server 110 can store public merchant information such as the merchant's address or phone number. The application server 110 can also be responsible for transferring a customer application to, or updating the customer application on, each customer device 102. Likewise, application server 110 can be responsible for transferring the merchant application, e.g., a digital wallet application 111, to, or updating the merchant application on, the merchant device 104. In particular, the application server 110 can be responsible for sending information about merchants that have accounts with the payment system to each customer device 102. The secure server 112 handles secure information such as credit card numbers, debit card numbers, bank accounts, customer accounts, customer identifying information or other sensitive information.

The payment service system 108 can communicate electronically with a card payment network 116, e.g., a network for processing a payment card such as Visa™ MasterCard™, or the like. The payment service system 108 can communicate with a computer system 116 of a card payment network, e.g., Visa or MasterCard. The payment service system 108 can communicate with a computer system of the card payment network 116 over the network 106 or over a different network. The computer systems of the card payment network 116 can communicate in turn with a computer system 118 of a card issuer, e.g., a bank. There can also be computer systems of other entities, e.g., the card acquirer, between the payment service system 108 and the card issuer.

Before a transaction between each customer and the merchant can be performed using the cardless payment system, each customer creates a customer account with the payment service system 108 and the merchant must create a merchant account with the payment service system 108.

A customer, e.g., an owner of a customer device 102a, 102b, or 102c, can sign up using a mobile application or using an online website. Prior to the transaction, a customer application is downloaded to the customer device 102, e.g., through an application store. Creation of the customer account can be handled through the customer application, or through another application, e.g., a generic web browser. The customer enters a name, account password, and contact information, e.g., email address. Before a transaction can be performed, the customer also enters financial account information sufficient to conduct the transaction into the payment service system 108. For example, in the case of a credit card account, the customer can enter the credit card issuer, credit card number and expiration date into the payment service system 108; the card validation value and mailing address may also be required. However, the financial account could also be associated with a debit card or pre-paid card, or another third party financial account.

In some implementations, the payment service system 108 requires additional personal identifying information before a transaction can be performed. For example, the payment service system 108 may require an image of the customer before a transaction can be performed. The image of the customer would be provided to the merchant so that the merchant can compare the image to the person. In addition, the payment service system 108 can require a personal identification number (PIN) be entered by the customer. Other requirements can also be added to increase security. The data associated with an account 114, e.g., a customer account, can be stored at the secure server 112, e.g., in a database.

If the customer is signing up with a mobile application, the customer's financial account information can be entered by swiping the financial transaction card through a slot of a card reader coupled to the mobile device. Alternatively, the customer can enter in financial account information by typing in information at the customer device 102, selecting a card from an application on the mobile device, from an online entity, or others. In some implementations, another external application generates a receipt that is sent to the customer. The receipt then includes a hypertext link that allows a customer to easily create a customer account in the cardless payment system. For example, activating the link in the receipt can automatically create a customer account with a payment card prefilled with the card used in the receipt to reduce effort by the customer. In effect, activating a new account using a receipt auto-verifies the customer into the cardless payment system.

The merchant can sign up for an account using the merchant device 104 or another device. The merchant enters a name, account password, and contact information, e.g., email address, and physical location information, e.g., an address, into the payment service system 108. The merchant can also provide other information, e.g., a list of goods or services available, operating hours, phone number, a small identifying image logo or mark, to the payment service system 108. The data associated with an account 114, e.g., a merchant account, can be stored at the secure server 112, e.g., in a database.

At some point prior to the transaction, a merchant application is downloaded to the merchant device 104, e.g., through an application store. Creation of the merchant account can be handled through the merchant application, or through another application, e.g., a generic web browser. The merchant application can include functions for splitting a bill between multiple customer devices 102a through 102c.

Eventually, in order to receive funds from the transaction, the merchant will need to enter financial account information into the payment service system sufficient to receive funds. For example, in the case of a bank account, the customer can enter the bank account number and routing number. However, the merchant's financial account can also be associated with a credit card account or another third party financial account. In addition, in some implementations, if the merchant has not entered the financial account information, the payment processor can hold the received funds until the financial account information is provided.

Figure 2:
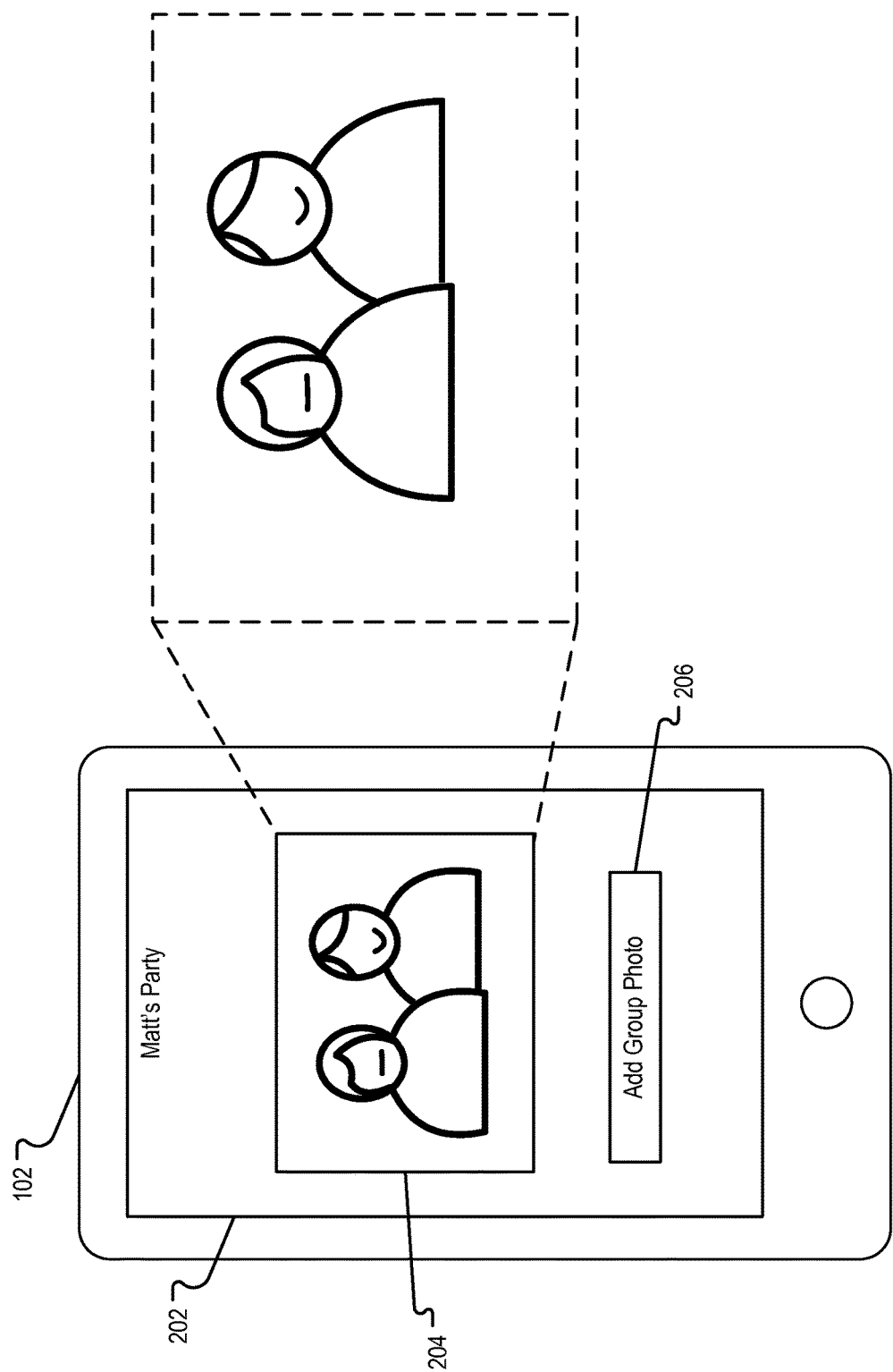
FIG. 2 is a diagram illustrating an example user interface for creating a group tab on a customer device.

FIG. 2 is a diagram illustrating an example user interface 202 for creating a group tab on a customer device 102. The customer device 102 can receive a user input to open a digital wallet application program. The digital wallet application program, e.g., digital wallet application program 111 (of FIG. 1), is a digital wallet application program that can open a group tab. A group tab is a data structure configured to record multiple sales transactions between a customer device 102 and a merchant device 104. The group tab is accessible by multiple customer devices and merchant devices. The group tab, once opened, can remain open until explicitly closed. The group tab can be associated with a particular group of people for a particular event.

Upon launching, the digital wallet application program creates the group tab. The group tab can be associated with a group tab label that describes the group or the event, e.g., "Matt's Party" as provided by a user. The group tab can be linked to a financial account, e.g., a credit card account, of the user. The digital wallet application displays user interface 202 for adding images of people in the group who are authorized to purchase goods or services for themselves or for the group. The customer device 102 may provide the images to a merchant selling the goods or services for authentication. The images can include a group image where multiple people appear in one image. For example, the group of people includes person A and person B at a social gathering. The user interface 202 can include a live view area 204 and an add image button 206. The live view area 204 displays a live image of a subject a camera lens of the customer device 102 is facing. Upon receiving a user input through the add image button 206, a snapshot of the live view area 204 is associated with the group tab.

Figure 3:
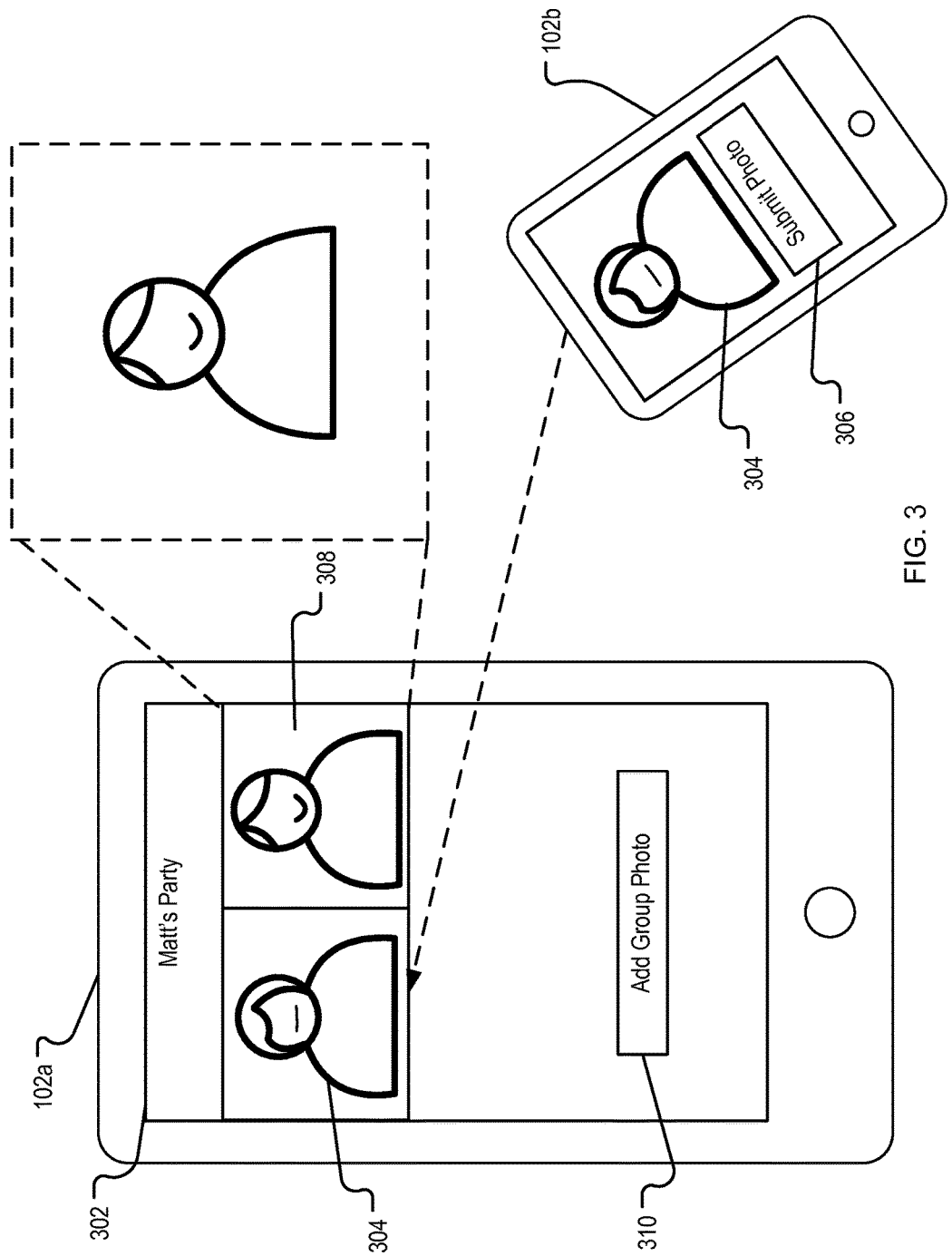
FIG. 3 is a diagram illustrating an example user interface for creating a group tab on a customer device.

FIG. 3 is a diagram illustrating an example user interface 302 for creating a group tab on a customer device 102a. The digital wallet application program executing on the customer device 102a can receive a user input for automatically generating images for a group tab. Upon receiving the user input, the customer device 102a can broadcast a signal requesting customer devices located within a communication range of the customer device 102a to provide images. A customer device 102b of a member of the social event is located in range. The customer device 102b detects the signal requesting images. In response, a digital wallet application program of customer device 102b displays an image 304 of the member that has been previously associated with an account of that member, and a user interface item 306, e.g., a virtual button, for granting permission to submit the image. Upon receiving a user input through the user interface item 306, the customer device 102b can transmit the image 304 to the customer device 102a.

Upon receiving the image 304 from the customer device 102b, the customer device 102a displays the image 304 in the user interface 302. The customer device 102a may receive multiple images from multiple customer devices of members of the social gathering. The customer device 102a can display these images in a grid or a scrollable list.

For members who do not have a customer device with a digital wallet application program or for members who refuse to grant permission to submit an image, the customer device 102a can create an image for each of these members. For example, the customer device 102a can create an image 308, e.g., by taking a photograph, of an individual member, and add the image 308 to the grid or list. Upon receiving an input through an add image button 310, the digital wallet program can associate images in the grid or list, including image 304 and image 308, to the group tab.

Figure 4A:
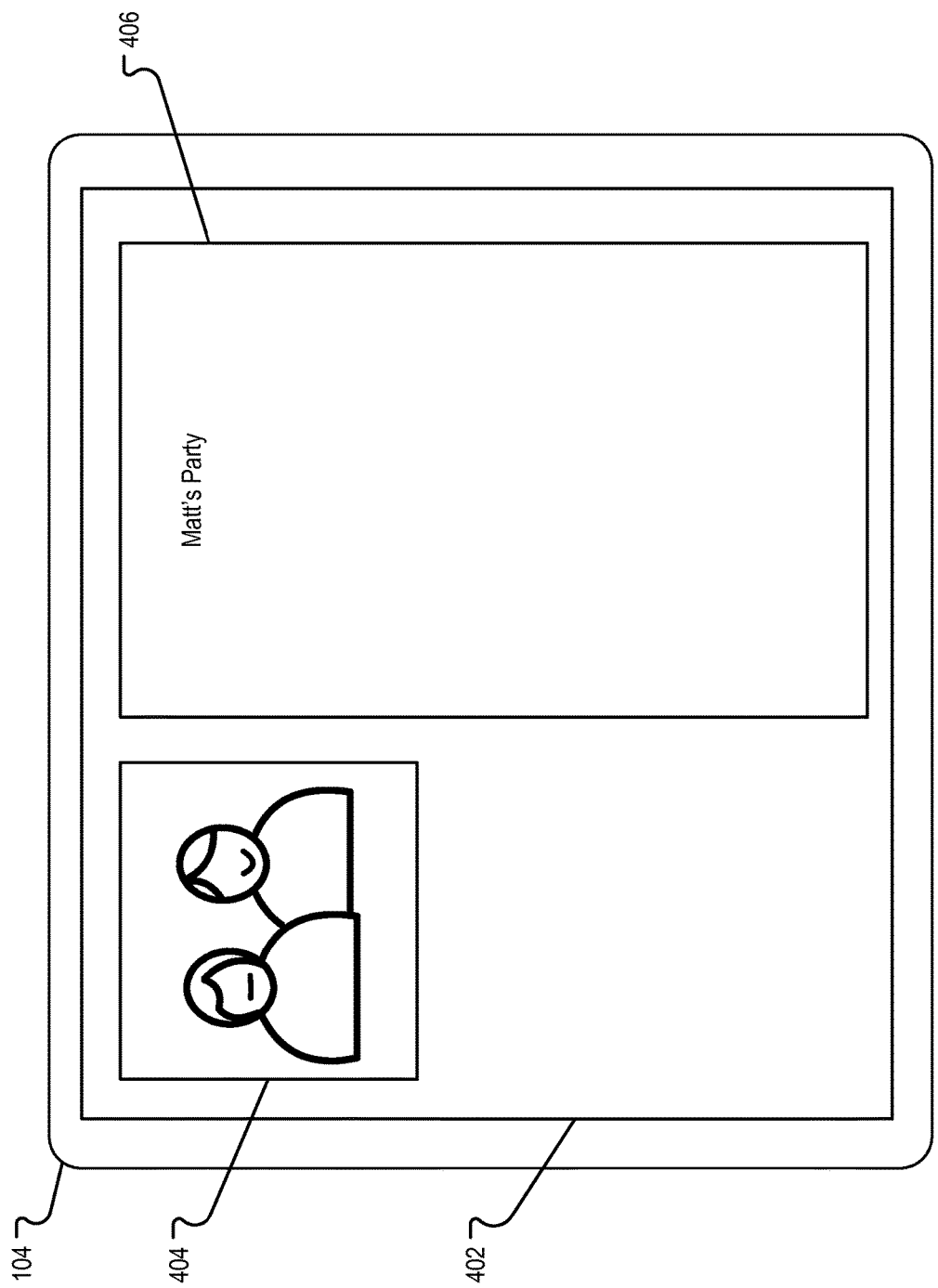
FIGS. 4A and 4B are diagrams illustrating example user interfaces for opening a group tab on a merchant device.
Figure 4B:
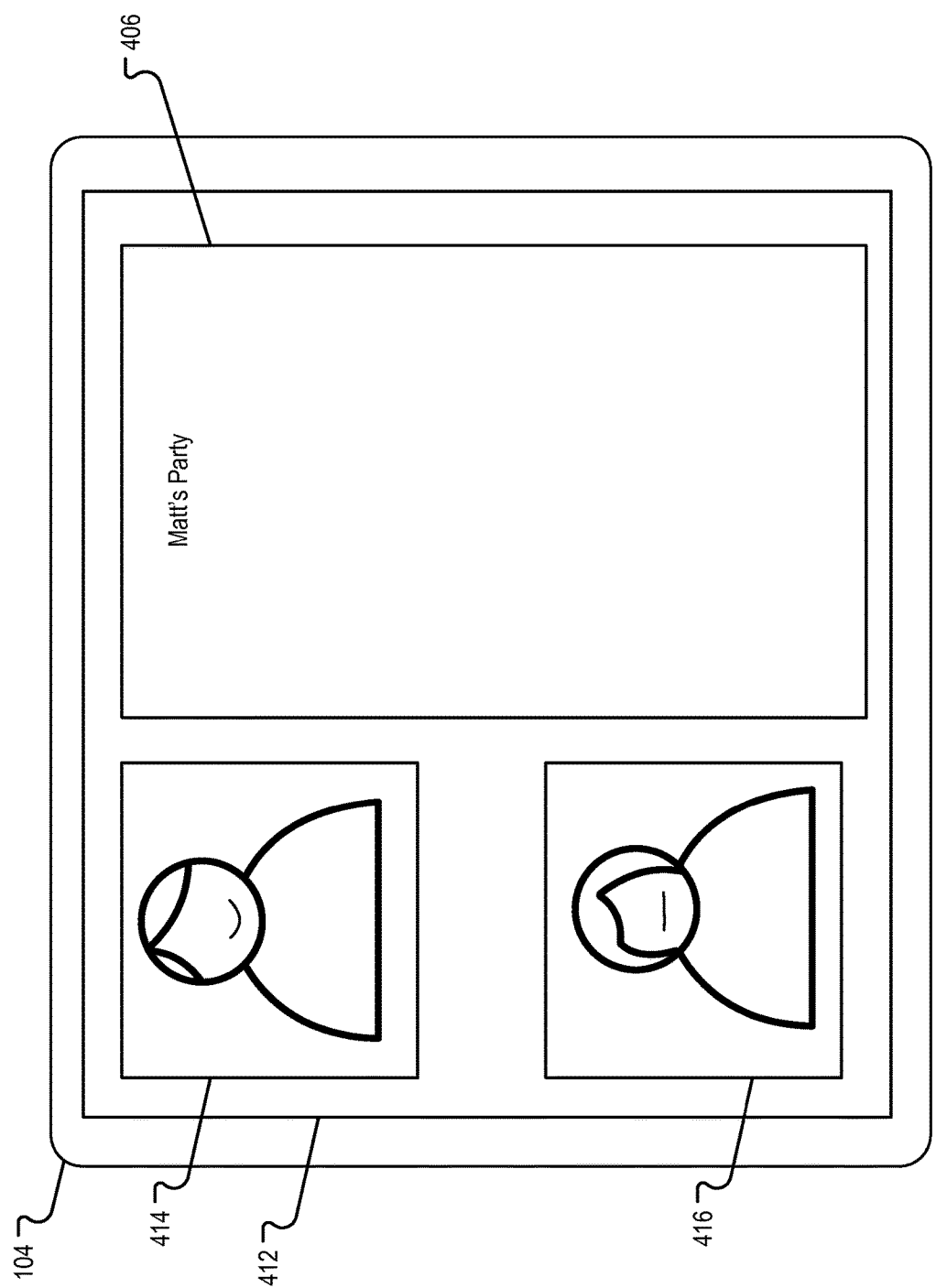

FIGS. 4A and 4B are diagrams illustrating example user interfaces for creating a tab from a digital wallet on a merchant device 104. The merchant device 104 can be alerted to a presence of a customer device 102 in proximity with the merchant device 104. For example, the merchant device 104 can include or be coupled to a wireless beacon that has a range of X feet. Upon detecting a signal from the wireless beacon, the customer device 102 can transmit a request. The merchant device 104, upon detecting the request, can trigger the merchant device 104 to communicate directly or indirectly with the customer device 102, including receiving from the customer device 102 information on the group tab. In some implementations, the customer device 102 can determine that the customer device 102 is located within a geofence of the merchant device 104. In response, the customer device 102 notifies a payment service system, e.g., the payment service system 108 of FIG. 1. The payment service system can then send the information on the group tab to the merchant device 104. The information can include the label of the group tab (e.g., "Matt's Party") and images associated with the group tab. The merchant device can display the information in a user interface.

FIG. 4A illustrates an example user interface 402 where a group image is displayed. The merchant device 104 can trigger the display of the user interface 402 upon receiving an input opening the group tab. The user interface 402 includes a group image 404, as submitted by the customer device 102. The user interface 402 can include a tab area 406 for adding items to the group tab. FIG. 4B illustrates an example user interface 412 where individual images are displayed. The user interface 412 includes a first individual image 414 and a second individual image 416. In some implementations, each of the first individual image 414 and the second individual image 416 can initially have a small size, e.g., the size of an icon, and expandable to a full size, e.g., N times the size of the icon, upon receiving a user input zooming in on the icon. In some implementations, each of the first individual image 414 and the second individual image 416 can be stacked on one another. The stack can expand to show both the first individual image 414 and the second individual image 416 upon receiving a user input for viewing the stack.

Figure 5:
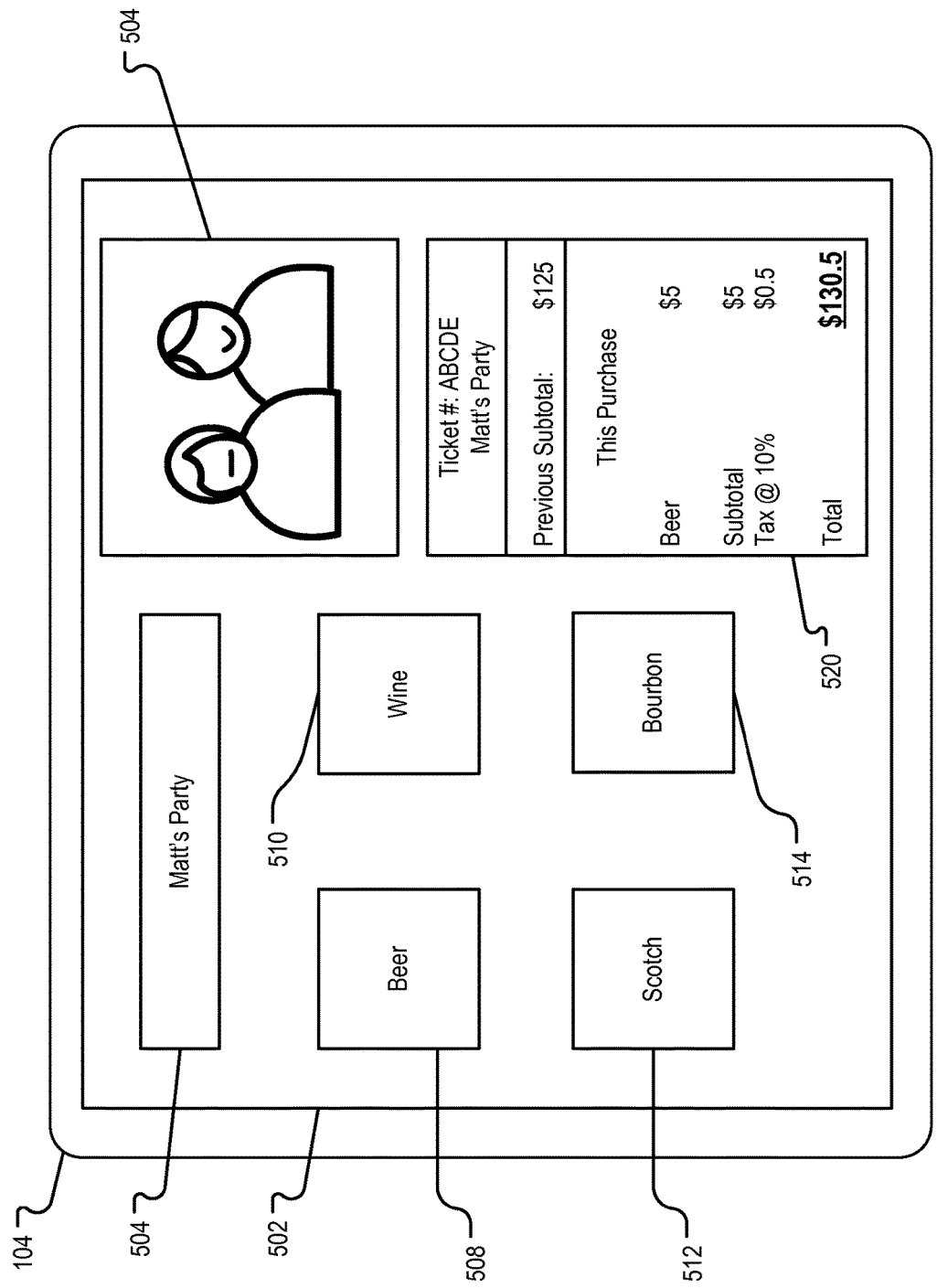
FIG. 5 illustrates an example user interface of a merchant device for adding an item to a group tab.

FIG. 5 illustrates an example user interface 502 of merchant device 104 for adding an item to a group tab. The merchant device 104 displays the user interface 502 in response to a request to open the group tab. When a person of the group wishes to buy an item, the person can walk to a merchant, e.g., a cashier, and declare to the merchant that the person is a member of "Matt's party." The person can tell the merchant that the person intends to add the item to the group tab, e.g., a group tab for "Matt's Party." The cashier may open a group tab labeled as "Matt's Party." The user interface 502 for the group tab includes a label 504 of the group tab, one or more images 504 of people in the group, and one or more user interface items 508, 510, 512, and 514 for available items. The user interface 502 includes a ticket display area 520 that can display a ticket number and a subtotal of all items previously purchased using the group tab.

The cashier may view the one or more images 504 and identifies from one or more images 504 an image that matches the person in appearance. The cashier can select the matching image, e.g., by clicking on the matching image. Upon receiving the selection, the merchant device 104 can allow additional input for adding records of purchases to the group tab.

For example, upon receiving a selection input, e.g., a touch input on user interface item 508, the merchant device 104 can add a record of the item represented by the user interface item to the ticket display area 520. The record can include a price for the item. The merchant device 104 can charge a financial account lined to the group tab upon adding the item, upon closing the transaction of selling the item, or at a later time upon closing the group tab.

Figure 6:
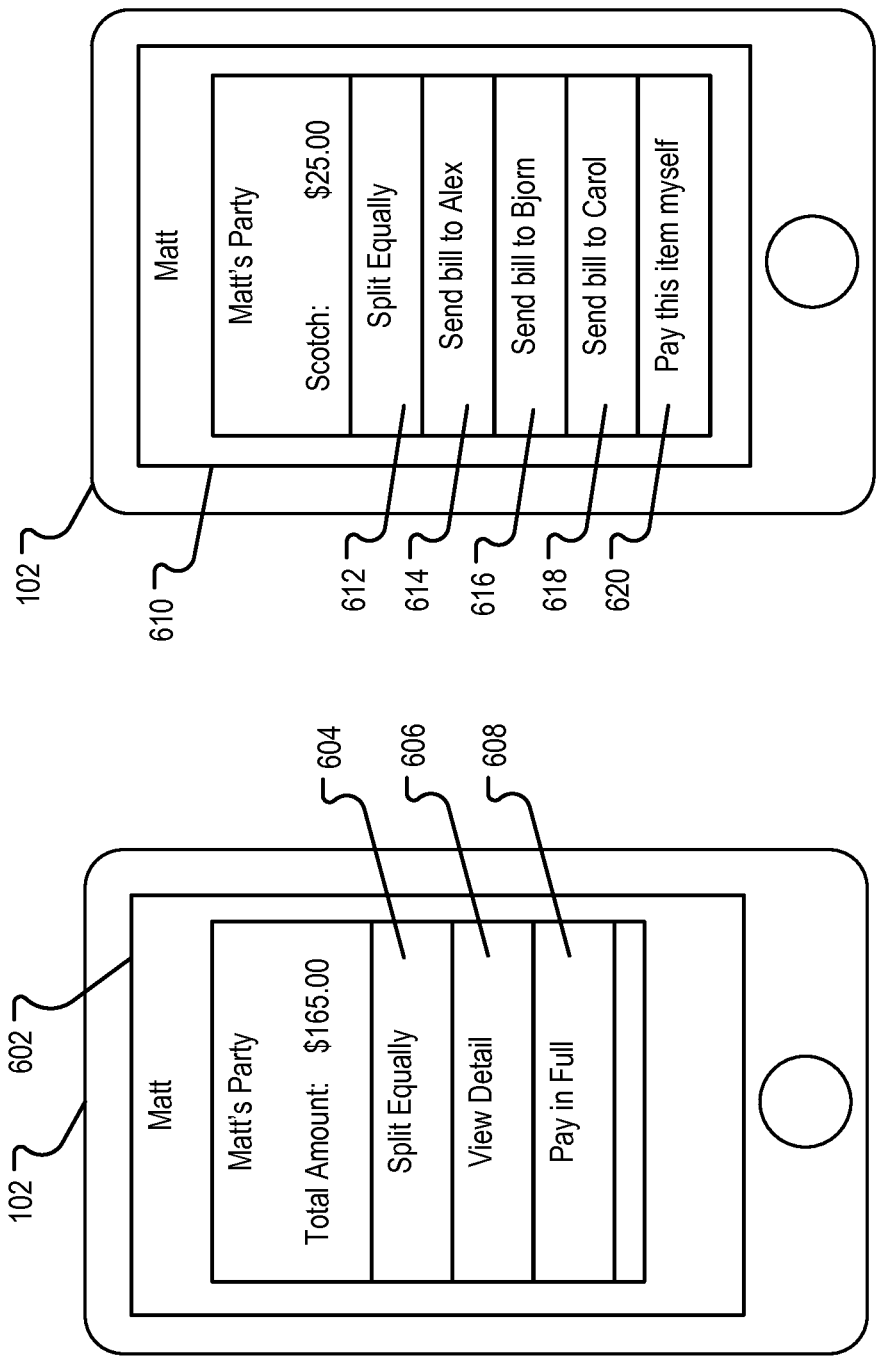
FIGS. 6A and 6B are diagrams illustrating example user interfaces for splitting a group bill on a customer device.

FIGS. 6A and 6B are diagrams illustrating example user interfaces for splitting a group bill on a customer device 102. Upon closing the group tab, or later, the customer device 102 can display the user interface 602, as shown in FIG. 6A. The user interface 602 can display a name of a financial account of the user, e.g., "Matt," and a label of the group tab, e.g., "Matt's Party." The user interface can display a total amount of a bill of the group tab. The user interface can include split bill button 604, view detail button 606, and pay-in-full button 608.

Upon receiving an input through the split bill button 604, the customer device 102 can divide the bill evenly, and send each divided bill to a customer device of each person in the group. If a customer device receiving the split bill has a digital wallet application program accessible by a group of people, that customer device can automatically pay the portion of the bill received to the financial account of the user of the customer device 102 as reimbursement. The customer device 102 can then show a message that the reimbursement has been received. If a customer device receiving the split bill does not have digital wallet functions, or if a person of the user does not have a customer device, the customer device 102 can send a message, e.g., a text message or an email, to the person reminding the person to pay.

Upon receiving an input through the view detail button 606, the customer device 102 can display details of the bill of the group tab, including a list of items purchased, price of each item, and time of each purchase. Each entry in the list can be a user interface item operable to receive a user input selecting the item. For example, an entry "Scotch" in the list can receive a touch input. In response, the customer device 102 displays user interface 610 of FIG. 6B, showing the item selected, and a list of options. The list can include split option 612 for splitting bill of this particular item equally among people in the group, individual options 614, 616, and 618 for sending the bill of this item to a particular person, e.g., Alex, Bjorn, or Carol, respectively. The list can include self-pay option 620, for paying the item using a financial account of the user of the customer device 102.

Upon receiving an input through the pay-in-full button 608, the customer device 102 can submit a notification to a server that payment of the entire bill is authorized by the user. The server can respond to the notification by submitting a payment amount to a financial service, e.g., a credit card company, for further processing.

Figure 7:
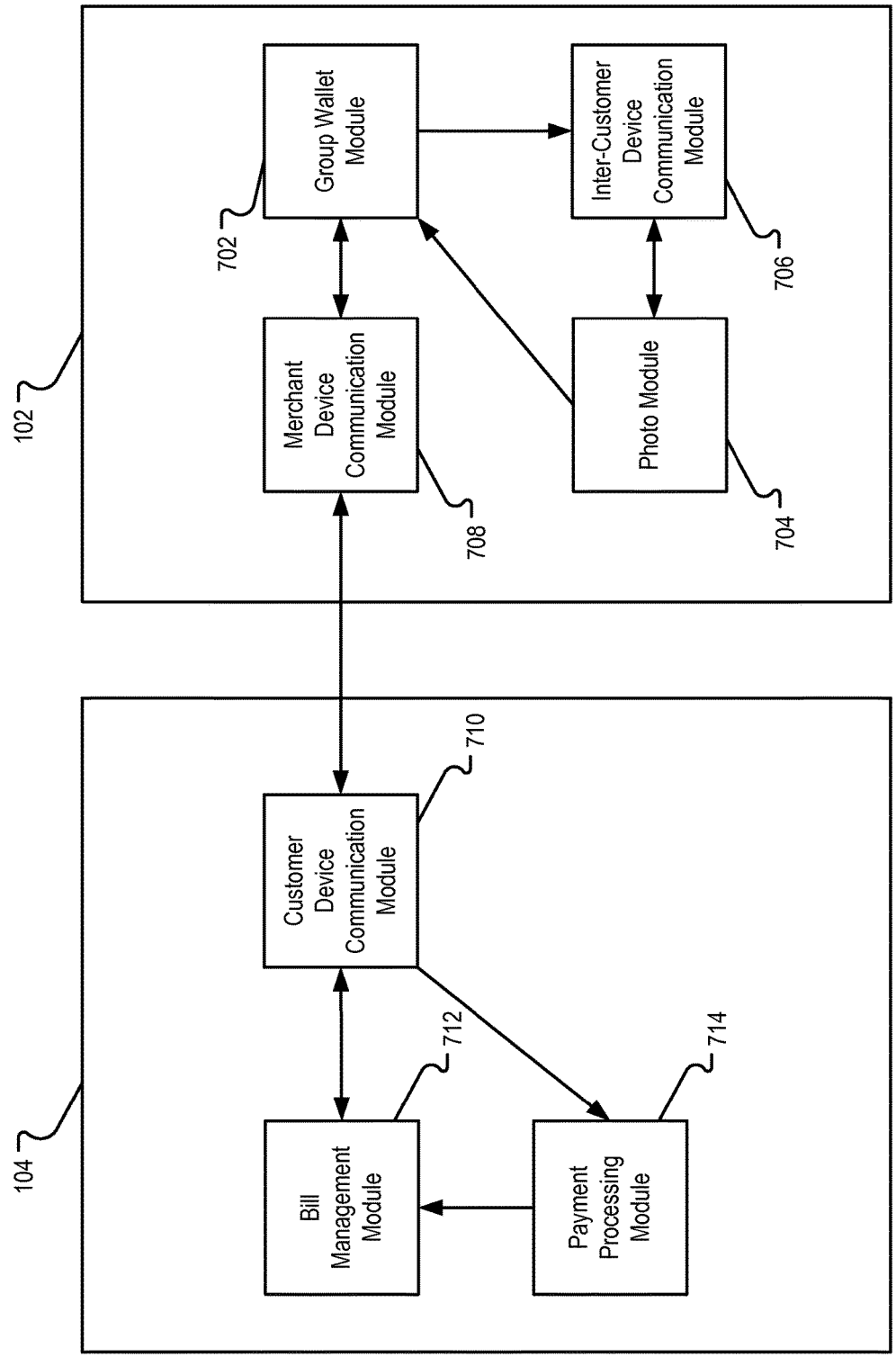
FIG. 7 is a block diagram illustrating components of an example system implementing a digital wallet for a group of people.

FIG. 7 is a block diagram that illustrates components of an example system implementing a digital wallet for a group of people. The system can include a merchant device 104 and one or more customer devices 102. Each of the merchant device 104 and customer device 102 can include one or more processors and a storage device storing instructions operable to cause the one or more processors to perform group wallet operations.

The customer device 102 includes a group wallet module 702. The group wallet module 702 is a component of the customer device 102 configured to receive a user input to create a group tab, link a group tab to a financial account of a user, and add a list of users and images of the users to the group tab.

The customer device 102 includes an image module 704. The image module 704 is a component of the customer device 102 configured to create an image of a group of users or a list group for each individual person in the group, and provide the images to the group wallet module 702 for the group tab. In some implementations, the image module 704 can obtain at least some of the images from an inter-customer device communication module 706.

The inter-customer device communication module 706 is a component of the customer device 102 configured to communicate with other customer devices, including requesting permission to add a user to the group, requesting user images from the other customer devices, submitting divided bills to the other customer devices, and sending text or email messages to the other customer devices when applicable. If the inter-customer device communication module 706 receives user images, the inter-customer device communication module 706 can provide the user images to the image module 704.

The group wallet module 702 can send a group tab to the merchant device 104 through a merchant device communication module 708. The merchant device communication module 708 is a component of the customer device 102 configured to communicate with the merchant device 104 to submit a group tab, receive a partial bill or final bill for the group. The merchant device communication module 708 can provide the bill to the group wallet module 702, which can divide the bill and submit the divided bill to the inter-customer device communication module 706 for presenting to other customer devices. The merchant device communication module 706 can include hardware and software for conducting wired or wireless communications.

The merchant device 104 includes a customer device communication module 710. The customer device communication module 710 is a component of the merchant device 104 configured to communicate with the merchant device communication module 708 of the customer device 102 through a wired or wireless connection. The customer device communication module 710 can receive a request from the customer device 102 to open the group tab, created at the customer device 102, at the merchant device 104. The request can include the identifier of the group tab, financial account information, and one or more images of members of the group. The customer device communication module 710 can provide partial bills or a final bill for the group tab to the customer device 102.

The merchant device 104 includes a bill management module 712. The bill management module 712 is a component of the merchant device 104 operable to receive input from a merchant or merchant employee specifying goods or services purchased in a transaction and a price of each item of the goods or services. The bill management module 712 then adds the item to a group tab. The bill management module 712 can send a final bill associated with the group tab or portions of the bill associated with the group tab, upon each individual purchase, to a payment processing module 714 for further processing.

The payment processing module 714 is a component of the merchant device 104 configured to communicate with a card payment network, e.g., the card payment network 116 of FIG. 1, to process payment received from the customer device communication module 706. Once the payment is approved, the payment processing module 714 informs the bill management module 712, which can inform the customer device 102, through the customer device communication module 710, that the bill has been paid.

Figure 8:
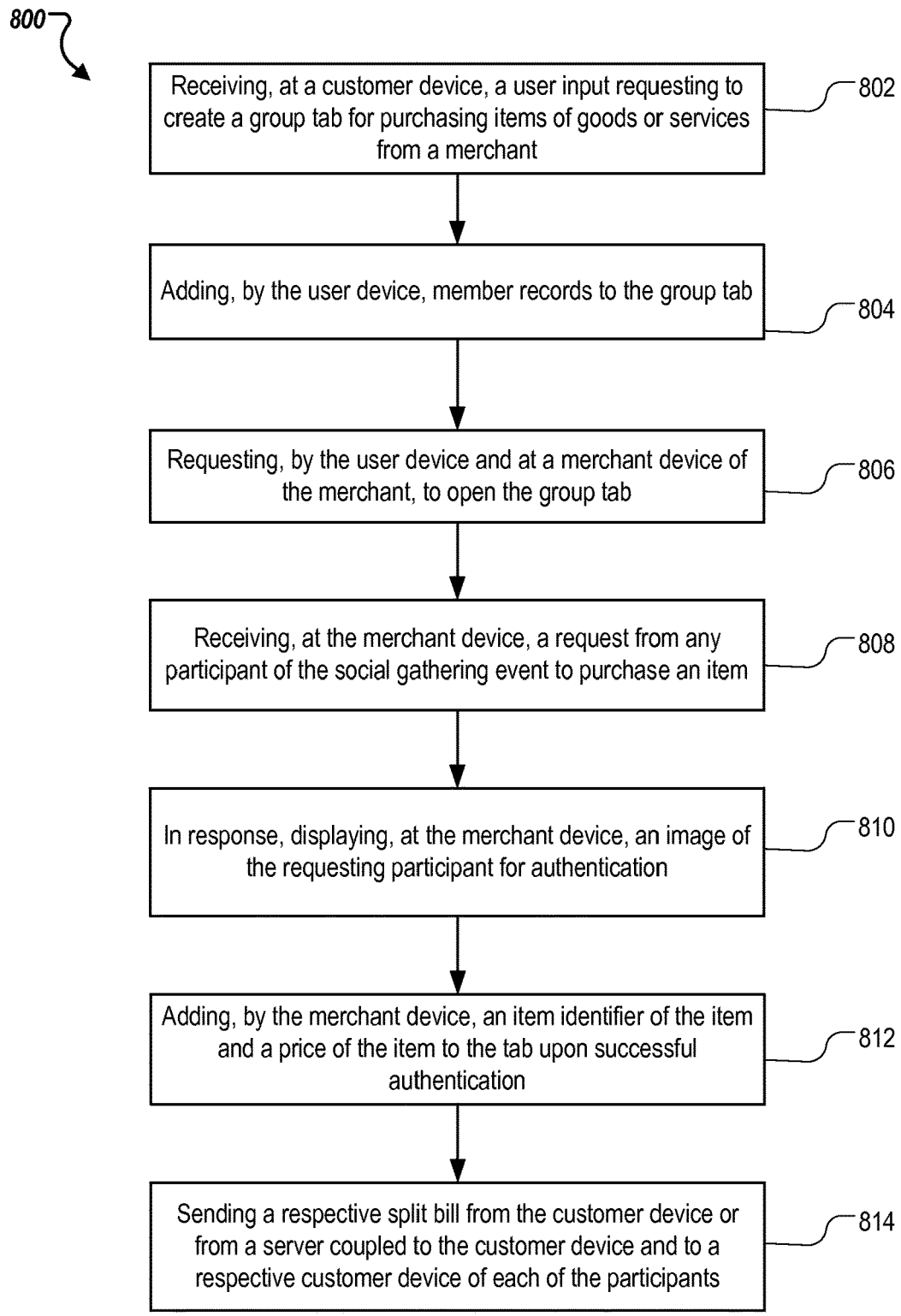
FIG. 8 is a flowchart of an example process of creating, using, and closing a group tab.

FIG. 8 is a flowchart of an example process 800 of opening, using, and closing a group tab. The process 800 can be performed by a system including a customer device, e.g., the customer device 102 of FIG. 1, and a merchant device, e.g., the merchant device 104 of FIG. 1.

The customer device receives (802) a user input requesting to create a group tab for purchasing goods or services from a merchant. The group tab is associated with a social gathering event having multiple members and is linked to a financial account, e.g., a credit card, debit card, gift card, or store card account of a user. The link to the financial account can be created by the customer device or a payment service system.

The user device adds (804) member records to the group tab. Adding the member records includes adding an image of each member of the social gathering event. The image can be a group image that includes all members, or an individual image for each corresponding member, or a combination of images of single and multiple members.

The customer device requests (806), directly or through a payment service system, to open the group tab at a merchant device of the merchant. Requesting to open the group tab includes submitting each image added to the group tab to the merchant device by the customer device or by the payment service system.

The merchant device can receive (808) a request from any member of the social gathering event to purchase an item of goods or services, in person or through a customer device of that member. The member can request to charge the item to the group tab.

In response, the merchant device displays (810) an image of the requesting member for authentication. The merchant device adds (812) an item identifier of the item and a price of the item to the group tab upon receiving a cashier input indicating successful authentication.

Upon receiving a request to close the tab, the customer device may submit a payment amount, to be paid in full, to the payment system for further processing. The amount can include an indication that the payment amount is approved by a user. Alternatively, the customer device sends (814) a respective split bill from the customer device, or from a server coupled to the customer device, and to a respective customer device of each of the members. Each split bill includes an amount of all purchases by the members divided by number of members.

Figure 9:
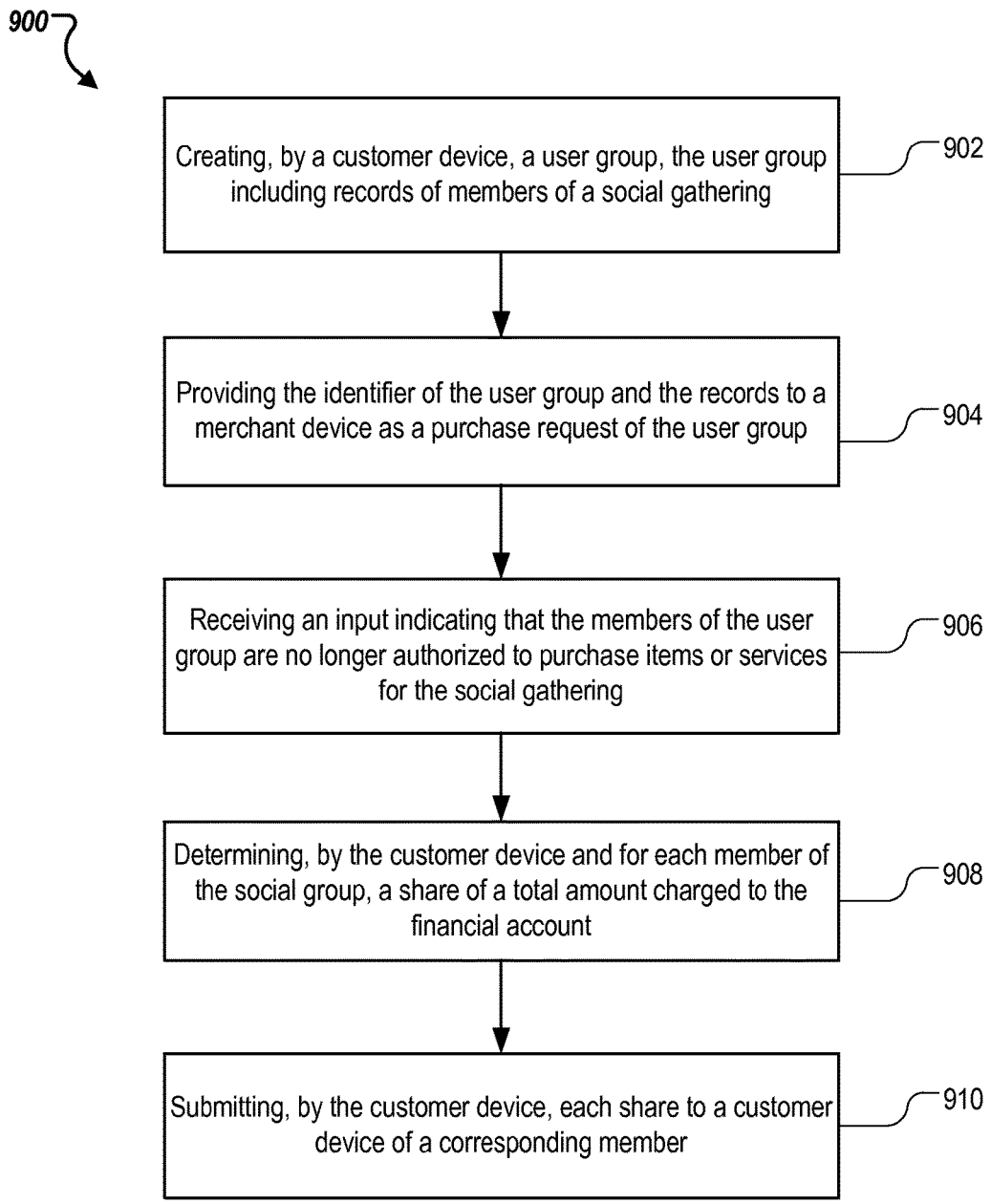
FIG. 9 is a flowchart of an example process of creating, using and closing a group tab.

FIG. 9 is a flowchart of an example process 900 of opening, using, and closing a group tab. The process 900 can be performed by a customer device, e.g., the customer device 102 of FIG. 1.

The customer device creates (902) a user group. The user group includes records of members of a social gathering at a venue where a merchant device is located. The merchant device is configured to facilitate financial transactions for the members to purchase goods or services for the social gathering. Creating the user group includes the following operations. The customer device obtains, automatically or through a user input, an identifier of the user group. The customer device adds the records of the members to the user group. Each record includes an image of a corresponding member of the user group. The customer device, or a payment service system, associates the identifier and the records with information on a financial account.

In some implementations, adding the records of the members to the user group can include obtaining a group image that includes an image of each member of the user group and designating the group image as the records of the members. In some implementations, adding the records of the members to the user group can include obtaining an individual image for each member of the user group, and adding each individual image as a record of a corresponding member.

The customer device provides (904) the identifier of the user group and the records to the merchant device as a purchase request of the user group, directly or through a payment service system. The purchase request indicates that each member of the user group, upon authentication, is authorized to purchase the items or services and is authorized to charge the purchased items to the financial account of the user through the merchant device.

The merchant device receives the purchase request from the customer device. The merchant device can provide, for display at the merchant device, the images of the members of the user group. Providing the images for display can include, upon receiving, by the merchant device, an input for processing the group purchase request, displaying a group image or displaying individual images of each member. Displaying individual images of each member can include displaying the individual images simultaneously on a display device, or in sequence on the display device, upon receiving an input to zoom in. Upon receiving an input at the merchant device confirming that an image of a buyer who claims to be a member of the user group is among the images in the purchase request, the merchant device can displaying a user interface for entry of the item to be purchased by the buyer. The input can include an input to zoom in the group image. The merchant device can charge a price of the item to the financial account of the user who created the user group.

The customer device receives (906) an input indicating that the members of the user group are no longer authorized to purchase items or services for the social gathering. The input can be a user input for closing a group tab.

In response, the customer device determines (908), for each member of the user group, a share of a total amount charged to the financial account. The customer device can determine the share by evenly dividing the total amount, or on an item-by-item basis. In some implementations, each member has a group wallet application program on the member's customer device. When the member purchases an item, the merchant device can communicate with the group wallet application program and record an identifier of the member in association with the item. The customer device dividing the total amount can designate the shares to the members according to an amount of items or services purchased by each member.

The customer device may submit a payment amount, to be paid in full, to the payment system for further processing. The amount can include an indication that the payment amount is approved by a user. The customer device can submit (910) each share to a customer device of a corresponding member. Submitting the shares can include charging a financial account of a member through a digital wallet application program, or sending text messages or email messages. For example, the customer device can compose an electronic message, and send the electronic message to a first customer device of a first member. The customer device can request a second customer device of a second member to authorize charging the share to a digital wallet on a second customer device of the second member.

Figure 10:
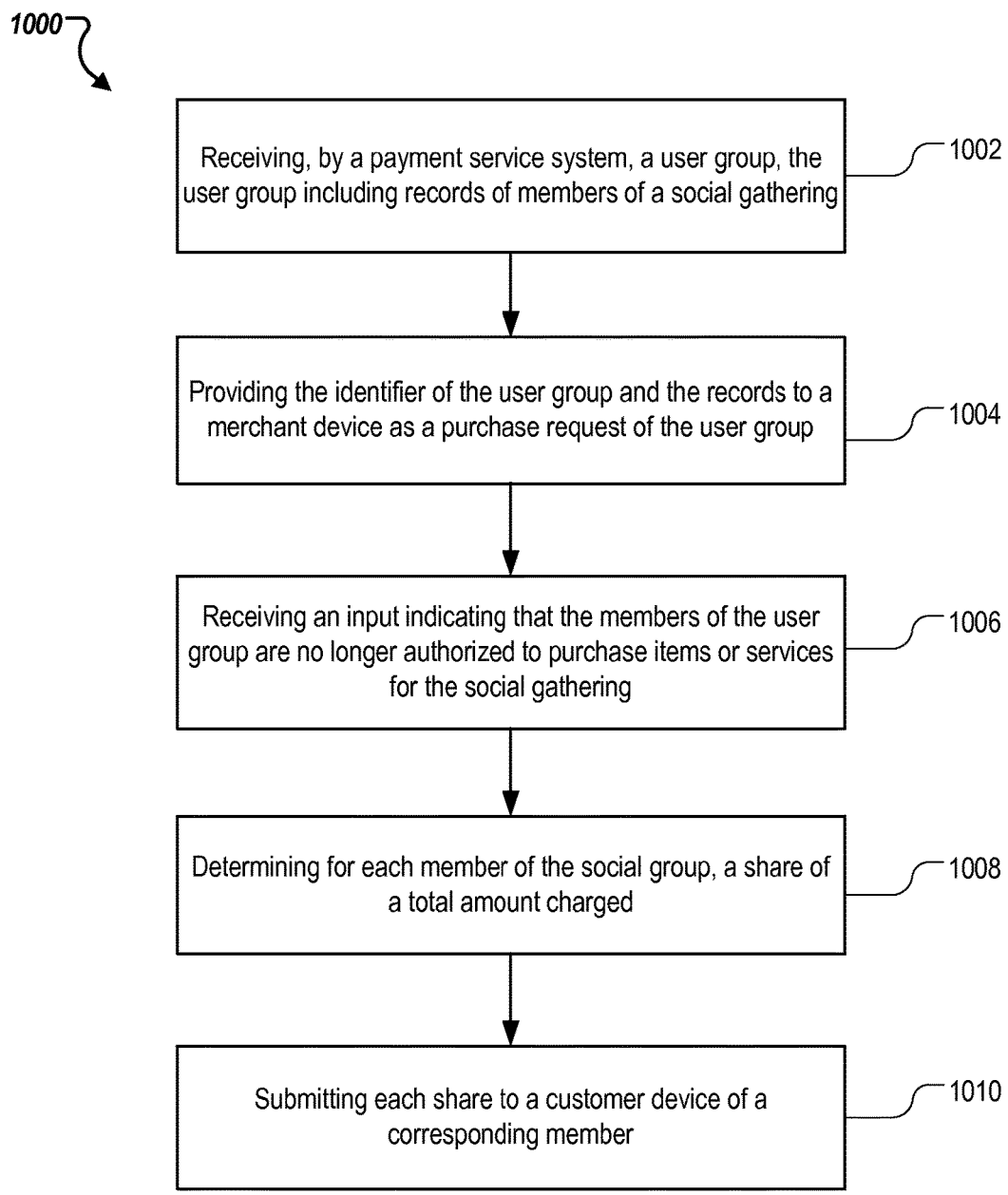
FIG. 10 is a flowchart of an example process of creating, using, and closing a group tab.

FIG. 10 is a flowchart of an example process 1000 of opening, using, and closing a group tab. The process 1000 can be performed by a payment service system, e.g., the payment service system 108 of FIG. 1.

The payment service system receives (1002) a user group. The user group includes records of members of a social gathering at a venue where a merchant device is located. The merchant device is configured to facilitate financial transactions for the members to purchase goods or services for the social gathering. Receiving the user group includes the following operations. The payment service system receives, from a customer device, an identifier of the user group. The payment service system obtains the records of the members to the user group. Each record includes an image of a corresponding member of the user group. The identifier and the records are associated with information on a financial account. The image can be a group image of at least two members of the user group. Each image can be an individual image for each member of the user group.

The payment service system provides (1004) the identifier of the user group and the records to the merchant device as a purchase request of the user group. The purchase request indicates that each member of the user group, upon authentication, is authorized to purchase the items or services and is authorized to charge the purchased items to the financial account of the user through the merchant device.

The merchant device receives the purchase request from the payment service system. The merchant device can provide, for display at the merchant device, the images of the members of the user group. Providing the images for display can include, upon receiving, by the merchant device, an input for processing the group purchase request, displaying a group image or displaying individual images of each member. Displaying individual images of each member can include displaying the individual images simultaneously on a display device, or in sequence on the display device, upon receiving an input to zoom in. Upon receiving an input at the merchant device confirming that an image of a buyer who claims to be a member of the user group is among the images in the purchase request, the merchant device can displaying a user interface for entry of the item to be purchased by the buyer. The input can include an input to zoom in the group image. The merchant device can charge a price of the item to the financial account of the user who created the user group.

The payment service system receives (1006) an input from a customer device indicating that the members of the user group are no longer authorized to purchase items or services for the social gathering. The input can be a user input for closing a group tab.

In response, the payment service system determines (1008), for each member of the user group, a share of a total amount charged to the financial account. The payment service system can determine the share by evenly dividing the total amount, or on an item-by-item basis. In some implementations, each member has a digital wallet application program on the member's customer device. When the member purchases an item, the merchant device can communicate with the digital wallet application program and record an identifier of the member in association with the item. The customer device dividing the total amount can designate the shares to the members according to an amount of items or services purchased by each member.

The payment service system submits (1010) each share to a customer device of a corresponding member. Submitting the shares can include charging a financial account of a member through a digital wallet application program, or sending text messages or email messages. For example, the payment service system can compose an electronic message, and send the electronic message to a first customer device of a first member. The payment service system can request a second customer device of a second member to authorize charging the share to a digital wallet on a second customer device of the second member.

At various stages, payment service system can receive an input from a customer device indicating that the user who created the group authorizes payment in full of all purchased made for the group by group members. In response, the payment service system can close the tab if the tab is still open, and submit the payment amount on the tab to a financial service for approval.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on a non-transitory computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language resource), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending resources to and receiving resources from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method comprising:
   receiving, at a first mobile device associated with a first customer, identifying information from at least a second mobile device associated with a second customer;
   generating, based on receiving the identifying information and via an application executing on the first mobile device, an interface identifying a group tab to be associated with one or more purchases between a merchant and members of a group including the first customer and at least the second customer, the one or more purchases being part of a transaction between the group and the merchant, each of the members of the group and the merchant having an existing account with a payment service provider that includes stored identifying information and stored financial information of a respective one of the merchant and the members of the group;
   receiving, via the application, input relating to the one or more purchases between the members of the group and the merchant;
   authorizing, via the application and based on input from the first customer, a cardless payment to the merchant for a total payment amount of the transaction to be completed by the payment service provider using the stored financial information of the merchant and the stored financial information of the first customer;
   generating, via the application and on the interface of the first mobile device, at least one option for splitting the total payment amount among the members of the group;
   receiving, via input from the first customer on the interface of the first mobile device, instructions for splitting the total payment amount, the instructions identifying at least one other member of the group responsible for a portion of the cardless payment made to the merchant via the first mobile device;
   based on the instructions, facilitating, via the application on the first mobile device, transmission of a payment request to a corresponding mobile device of the at least one other member of the group to authorize a cardless payment to the first customer for a corresponding portion of the payment owed by the at least one other member;

upon receiving an indication to satisfy the payment request by the at least one other member, facilitating, via the payment service, the cardless payment between the first customer and the at least one other member of the group being using the stored financial information of the first customer and the stored financial information of the at least one other member of the group; and upon completion of a corresponding cardless payment from the at least one other member of the group to the first customer, generating, on the interface at the first mobile device, a notification of completion of the corresponding cardless payment.

2. The method of claim 1, wherein the identifying information includes an image of at least the second customer.

3. The method of claim 1, wherein the group has group identifying information that includes an image associated with the group and a description of the group.

4. The method of claim 1, wherein the input relating to the one or more purchases is received from a merchant device associated with the merchant.

5. The method of claim 1, the notification includes an itemized record of the one or more purchases, each itemized record being selectable; and the method further includes:
receiving, on the interface, a selection of one of the one or more purchases to yield a selected purchase; and
presenting, on the interface, the at least one option for the selected purchase, the at least one option including one or more of:
a first option to split a cost of the selected purchase equally among all members of the group,
a second option to send the cost of the selected purchase to the at least one other member of the group,
a third option for the first customer to pay for the cost of the selected purchase, and
a fourth option to view details of the selected purchase.

6. The method of claim 5, wherein the instructions for splitting the payment is a selection of one or more of the at least one option.

7. The method of claim 1, wherein the request is transmitted to a bill splitting application on the corresponding mobile device of the at least one other member of the group or as one of a text message or an email.

8. A method comprising:
receiving, at a payment service provider and from a mobile application executing on a first mobile device, a request to create a group tab on the first mobile device to be associated with one or more purchases between a merchant and customers, each of the customers and the merchant having an existing account with the payment service provider that includes stored identifying information and stored financial information of a respective one of the merchant and the customers;
adding, by the payment service provider, the customers to the group tab;
receiving, by the payment service provider and from a merchant device associated with the merchant, a record of one or more purchases by the customers of the group tab;
transmitting, by the payment service provider, the record of the one or more purchases to the mobile application on the first mobile device;
receiving, by the payment service provider and from the first mobile device, instructions to conduct a cardless transaction with the merchant to pay the merchant for a total cost of the transaction, the cardless transaction being conducted by the payment service provider using the stored financial information of the merchant and the stored financial information of a first customer of the group associated with the first mobile device;
receiving, by the payment service provider, instructions indicating a portion of the total cost owed by at least one other customer of the group;
transmitting, by the payment service provider, a notification to a mobile device of the at least one other customer of the group tab that includes a payment request for a corresponding portion owed for the total cost;
upon receiving an indication to satisfy the payment request by the at least one other customer, facilitating, by the payment service provider, a cardless transaction between the first customer and the at least one other customer of the group for payment of the corresponding portion using the stored financial information of the first customer and the stored financial information of each of the at least one other customer of the group;
transmitting, by the payment service provider, a confirmation of the cardless transaction for the corresponding portion to the first mobile device of the first customer of the group and each respective device of the at least one other customer.

9. The method of claim 8, wherein the group tab includes group identifying information as well as a corresponding identifying information for each of the customers of the group tab.

10. The method of claim 8, wherein the notification is one of a message displayed on a respective mobile application on the mobile device of the customers, a text message or an email.

11. The method of claim 8, further comprising:
receiving, by the payment service provider, instructions to settle with the merchant a bill associated with the transaction;
transmitting, by the payment service provider, a request to the merchant device for the bill;
receiving, by the payment service provider, the bill from the merchant device; and
transmitting, by the payment service provider, the bill to the first mobile device.

12. A device comprising:
memory having computer-readable instructions stored therein; and
one or more processors configured to execute the computer-readable instructions to,
receive identifying information of a first customer, the first customer having an associated device, the device having an associated second customer;
generate, based on the identifying information and via an application executing on the device, an interface identifying a group tab to be associated with one or more purchases between a merchant and members of a group including at least the first customer and the second customer, the one or more purchases being part of a transaction between the group and the merchant, each of the members of the group and the merchant having an existing account with a payment service provider that includes stored identifying information and stored financial information of a respective one of the merchant and the members of the group;

receive, via the application, input relating to the one or more purchases between the members of the group and the merchant;

authorize, via the application, a cardless payment to the merchant for a total payment amount of the transaction to be completed by the payment service provider using the stored financial information of the merchant and the stored financial information of the second customer;

generate, via the application and on the interface, at least one option for splitting the total payment amount among the members of the group;

receive, via input from the second customer, instructions for splitting the total payment amount, the instructions identifying at least one other member of the group responsible for a portion of the total payment amount made to the merchant via the device;

based on the instructions, facilitate, via the application, transmission of a payment request to a corresponding mobile device of the at least one other member of the group to authorize a cardless payment to the second customer for a corresponding portion of the total payment amount owed by the at least one other member;

upon receiving an indication to satisfy the payment request by the at least one other member, facilitate, via the payment service, the cardless payment between the second customer and the at least one other member of the group being completed by the payment service provider using the stored financial information of the second customer and the stored financial information of the at least one other member of the group; and upon completion of a corresponding cardless payment from the at least one other member of the group, generate, on the interface, a notification of completion of the corresponding cardless payment.

13. The device of claim 12, wherein the identifying information includes an image of the first customer.

14. The device of claim 12, wherein the group has group identifying information that includes an image associated with the group and a description of the group.

15. The device of claim 12, wherein the one or more processor is configured to execute the computer-readable instructions to receive the input relating to the one or more purchases from a merchant device associated with the merchant.

16. The device of claim 12, wherein
the notification includes an itemized record of the one or more purchases, each itemized record being selectable; and
the one or more processor is configured to execute the computer-readable instructions to:
display, on the interface, an itemized record of the one or more purchases, each itemized record being selectable;
receive, on the interface, a selection of one of the one or more purchases to yield a selected purchase;
present, on the interface, the at least one option for the selected purchase, the at least one option including one or more of:
a first option to split a cost of the selected purchase equally among all members of the group,
a second option to send the cost of the selected purchase to the at least one other member of the group,
a third option for the first customer to pay for the cost of the selected purchase, and
a fourth option to view details of the selected purchase.

17. The device of claim 16, wherein the instructions for splitting the total payment amount is a selection of one or more of the at least one option.

18. The device of claim 12, wherein the request is transmitted to a bill splitting application on the corresponding mobile device of the at least one other member or as one of a text message or an email.

19. A system comprising:
a plurality of devices associated with a plurality of customers;
a merchant device associated with a merchant; and
a payment service provider having one or more processors configured to execute computer-readable instructions to,
receive a request from a first device of the plurality of devices for a mobile application;
transmit instructions for downloading the mobile application to the first device, the mobile application, once executed by the one or more processors on the first device, being configured to create a group tab on the first device to be associated with one or more purchases between the merchant and members of a group including the plurality of customers, the one or more purchases being part of a transaction between the members of the group and the merchant, each of the members of the group and the merchant having an existing account with the payment service provider that includes stored identifying information and stored financial information of a respective one of the merchant and the members;
add the plurality of customers to the group tab;
receive from the merchant device a record of the one or more purchases by the members of the group;
transmit the record of the one or more purchases to the mobile application on the first device;
receive, from the first device, instructions to conduct a cardless transaction with the merchant to pay the merchant for a total cost of the transaction, the cardless transaction being conducted by the payment service provider using the stored financial information of the merchant and the stored financial information of one of the members of the group associated with the first device;
receive instructions indicating a corresponding portion of the total cost owed by at least one other member of the group;
transmit a notification to a device of the at least one other member of the group tab that includes the corresponding portion of the payment;
facilitate a cardless transaction between the one of the members and the at least one other member of the group for payment of the corresponding portion, the cardless transaction between the one of the members of the group associated with the first device and each of the at least one other member of the group being facilitated by the payment service provider using the stored financial information of the corresponding members of the group;

transmit a confirmation of the cardless transaction for the corresponding portion to the first device and each respective device of the at least one other member.

20. The system of claim 19, wherein the group tab includes group identifying information as well as a corresponding identifying information for each of the plurality of customers that are part of the group tab.

21. The system of claim 19, wherein the notification is one of a message displayed on a respective mobile application on the device of the at least one other member of the group, a text message or an email.

22. The system of claim 19, wherein the payment service provider is further configured to execute the computer-readable instructions to,
   receive instructions to settle with the merchant a bill associated with the transaction;
   transmit a request to the merchant device for the bill;
   receive the bill from the merchant device; and
   transmit the bill to the first device.

\* \* \* \* \*